United States Patent [19]

Hill et al.

[11] Patent Number: 4,732,634
[45] Date of Patent: Mar. 22, 1988

[54] METHOD OF FORMING THREADED POLAR OPENINGS FOR COMPOSITE PRESSURE VESSELS

[75] Inventors: Paul W. Hill, Cumberland, Md.; Thomas C. White, Ridgley, W. Va.

[73] Assignee: Hercules Incorporated, Wilmington, Del.

[21] Appl. No.: 680,021

[22] Filed: Dec. 10, 1984

Related U.S. Application Data

[62] Division of Ser. No. 426,514, Sep. 29, 1982, Pat. No. 4,602,480.

[51] Int. Cl.⁴ .............................................. B65H 81/00
[52] U.S. Cl. .................................... 156/161; 156/165; 156/173
[58] Field of Search ............... 156/161, 162, 165, 169, 156/69, 171, 425, 172, 173, 175, 250; 138/109; 242/7.21, 7.02, 7.23, 7.22; 220/1 B, 67, 3; 285/327, 423, 333

[56] References Cited

U.S. PATENT DOCUMENTS

| | | | |
|---|---|---|---|
| 2,943,967 | 7/1960 | Simon | 156/171 |
| 2,964,209 | 12/1960 | Eddy | 220/3 |
| 3,124,001 | 2/1960 | Conley | 73/322.5 |
| 3,362,159 | 1/1968 | Heesacker | 30/253 |
| 3,407,101 | 10/1968 | Lockshaw | 156/173 |
| 3,969,812 | 7/1976 | Beck | 220/3 |
| 3,970,495 | 7/1976 | Ashton et al. | 156/162 |
| 4,138,285 | 2/1979 | Michael | 156/162 |

FOREIGN PATENT DOCUMENTS

| | | | |
|---|---|---|---|
| 932162 | 8/1973 | Canada | 60/253 |
| 910894 | 8/1954 | Fed. Rep. of Germany | 220/3 |
| 2044170 | 3/1972 | Fed. Rep. of Germany | 60/253 |
| 1456663 | 8/1964 | France | 220/3 |
| 1414309 | 11/1964 | France | 220/3 |
| 2305656 | 10/1976 | France | 220/3 |
| 615487 | 1/1961 | Italy | 220/3 |
| 757890 | 9/1956 | United Kingdom | 60/253 |
| 1161846 | 8/1967 | United Kingdom | 220/3 |
| 1453680 | 11/1973 | United Kingdom | . |
| 0583350 | 12/1977 | U.S.S.R. | 220/3 |

Primary Examiner—Michael Ball
Attorney, Agent, or Firm—Edmund C. Ross, Jr.

[57] ABSTRACT

A composite pressure vessel having a larger diameter, threaded polar opening with integrally depending threads is disclosed. The threaded polar opening is reinforced by a winding pattern that enables it to be closed against the axial forces resulting from significant internal pressures. This closure seals the interior of the pressure vessel in the tactical rocket motor case assembly disclosed.

11 Claims, 4 Drawing Figures

METHOD OF FORMING THREADED POLAR OPENINGS FOR COMPOSITE PRESSURE VESSELS

This application is a division of application Ser. No. 426,514, filed Sept. 29, 1982, now U.S. Pat. No. 4,602,480.

BACKGROUND OF THE INVENTION

1. Field of Use

This invention relates to filament wound pressure vessels having threaded openings and to closure thereof. This invention, more particularly, relates to reinforcing the threads in these openings against significant axial forces generated from within the pressure vessels. This invention, still more particularly, relates to increasing the resistance of these threaded openings to such internal forces through the filamentary reinforcement pattern wound into the threads and to accomplishing such reinforcement pattern in an industrially expedient fashion.

2. Prior Art

U.S. Pat. No. 3,124,001 discloses pressure vessels said to resist external pressure by means of internal, filament wound ribs. The pressure vessels in U.S. Pat. No. 3,124,001 have threaded polar openings. The threads are formed using saturated glass fiber fabric pulled down into a thread former with a tow of glass fiber. Such a thread design is unsuited to provide threaded openings whose closure resists significant internal pressures.

UK Pat. No. 1,453,680 discloses threaded polar openings in a rocket motor case wherein the threads are formed by causing continuous filament to track the inwardly extending contours of a thread former. Threads made in this manner will not resist the significant axial forces witnessed in the closure of large diameter openings of tactical rocket motors.

Certain other rocket motor cases have been proposed or made to include a single layer of continuous, uniaxial filament cut and pulled down into the thread former. However, the axial reinforcement of the threaded openings in these pressure vessels is included above the threads; such higher level axial reinforcement is insufficient to resist the magnitude of internal pressures witnessed by larger diameter polar openings of tactical rocket motor cases.

OBJECTS OF THE INVENTION

It is an object of this invention to provide a pressure vessel having an internally threaded polar opening that may be closed against the axial force resulting from significant internal pressure.

It is an object of this invention to provide such a pressure vessel that is suited for use as a tactical rocket motor case wherein the threaded polar opening has a diameter that substantially corresponds to that of the body of the motor.

It is an object of this invention to provide a method of manufacturing these pressure vessels.

These and other objects are accomplished in accordance with this invention; they are more fully characterized in the following together with the manner in which they have been presently achieved.

SUMMARY OF THE INVENTION

The pressure vessels of this invention comprise: first and second tubular sections which are integral around a common central longitudinal axis. The second tubular section is contoured with a ridge and a valley that adjacently spiral together around the inside thereof to form threads for closure of the vessel. The ridge depends integrally into the vessel and contains overlapping uniaxial filament layers and cloth filament layers in an alternating relation. Each of the layers of uniaxial filament extend continuously from a location in the first tubular section that is remote from the second tubular section to the end of the second tubular section that is remote from the first tubular section. The uniaxial filament of these layers is also: (i) disposed at an angle, relative to lines parallel to the aforesaid center axis, that has an absolute value of between about 5° and 35° in the second tubular section, and (ii) contoured to the ridge and valley of the second tubular section. The layers of cloth filament extend from locations in the first tubular section proximate the second tubular section to the end of the second tubular section that is remote from the first tubular section. The cloth filament of these other layers is also contoured to the ridge and valley in the second tubular section. Between each layer of uniaxial filament and cloth filament is a tow of filament. Each of these tows track the aforesaid ridge in tension. In making the vessels, the tow of filament pulls down either a layer of the cloth filament or a layer of the uniaxial filament into the ridge.

DETAILED DESCRIPTION OF PREFERRED EMBODIMENT OF THE INVENTION

Figure 1:
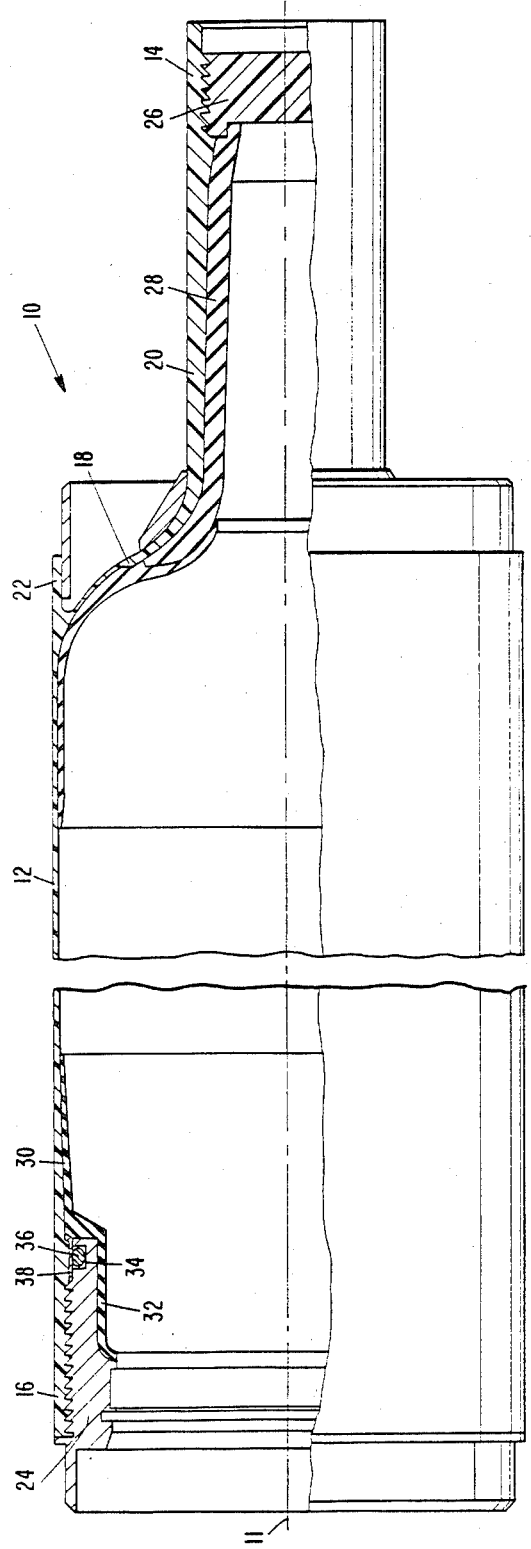
FIG. 1 illustrates a rocket motor case, partly in section, showing threaded polar openings of this invention.

Rocket motor case 10 in FIG. 1 comprises tube section 12 that is between aft threaded nozzle port 14 and forward threaded access port 16. Dome section 18 bridges between nozzle section 20 and the more forward, larger diameter, remainder of rocket motor case 10. Skirt section 22 is integral with this larger diameter remainder section and concentric about dome section 20.

Propellant is loaded in rocket motor case 10 through the threaded access port 16 into these larger diameter portions. Exhaust from burning this propellant during flight exits the rocket motor through nozzle port 14 via the nozzle section 20.

Threaded aluminum closure member 24 screws into threaded access port 16 and seals the forward end of rocket motor case 10. Closure member 24 has slightly tapered threads at an angle, for example, of 0°30'. Threaded elastomer plug 26 threads into nozzle port 14 at the other end of rocket motor case 10. Plug 26 is removed during motor assembly whereupon an aluminum threaded nozzle (not shown) is threaded into the nozzle port 14.

Rocket motor case 10 contains aft elastomer insulator 28. During cure operations aft elastomer insulator 28 becomes bonded circumferentially to the inside of motor case 10 around an aft portion dome section 18 and nozzle section 20, as shown in FIG. 1. Forward elastomer insulator 30 bonds circumferentially about the inside of a forward portion of rocket motor case 10 during these cure operations.

Insulator 30 has flap 32 which is spaced from the inside surface of access port 16. Flap 32 extends around the inside of the aft end of closure member 24 when closure member 24 fully engages into access port 16, as is shown in FIG. 1.

Closure member 24 and rocket motor case 10 seal together as follows. Annular groove 34 of closure member 24 carries o-ring 36. Rocket motor case 10 has integrated metal ring 38 slightly aft of threaded access port 16. Ring 38 depends into rocket motor case 10 somewhat more than the threads of access port 16. Ring 38 abuts o-ring 36 in providing the sealing engagement together with flap 32 when closure member 24 fully threads into access port 16.

Figure 2:
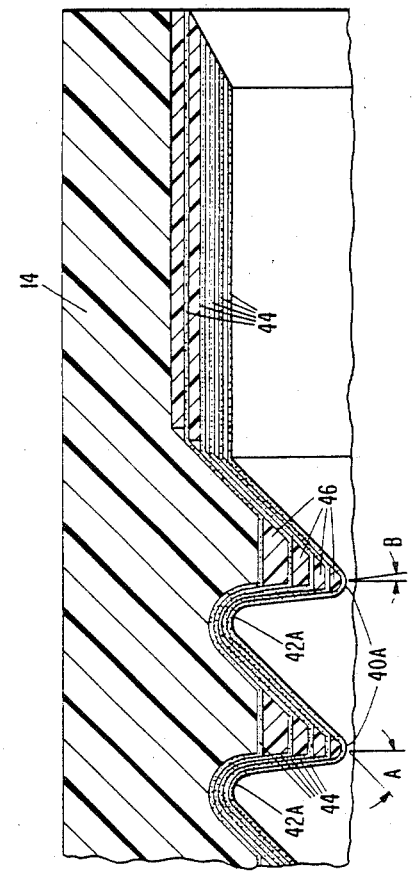
FIG. 2 illustrates the reinforcement in the aft portion of the buttress threads in the nozzle section of the rocket motor case of FIG. 1.
Figure 3:
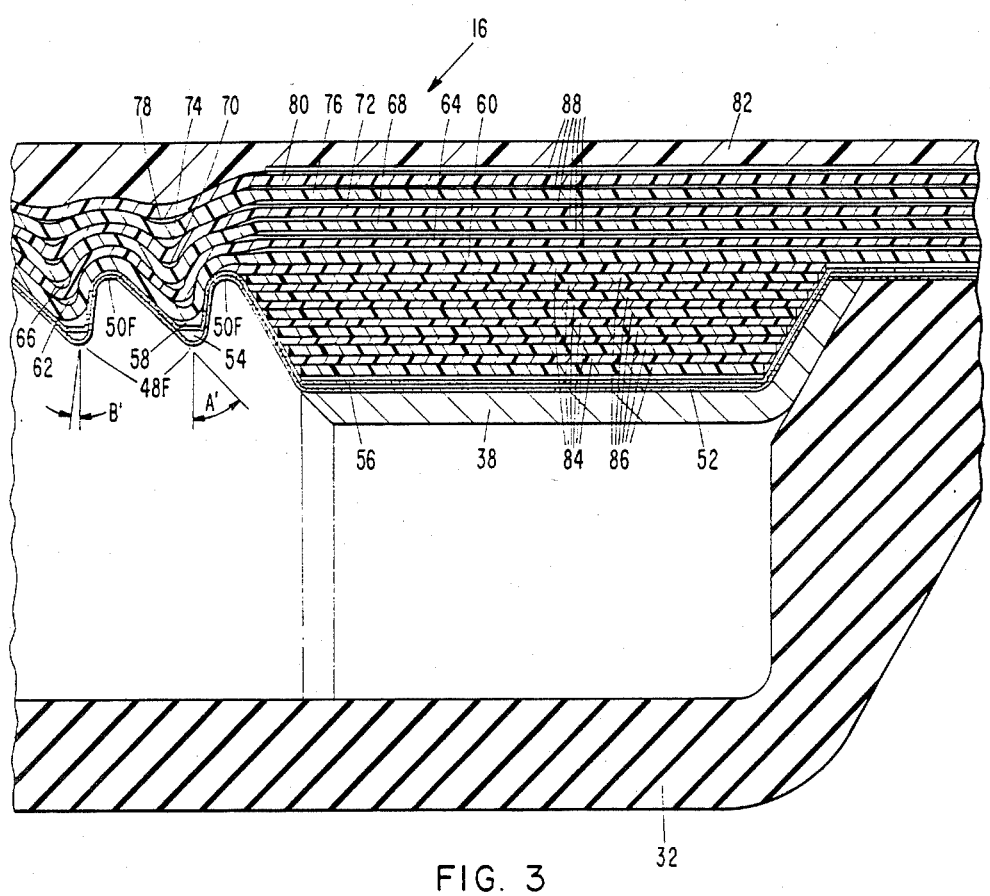
FIG. 3 illustrates the reinforcement in the aft portion of buttress threads in the forward opening of the rocket motor case of FIG. 1.

FIGS. 2 and 3 illustrate in greater detail the thread configuration for threads in nozzle port 14 and access port 16. The threads in each are buttress threads. These buttress threads have the configuration defined as follows: The thread of threaded access port 16 is 5.75 inch tapered 8 pitch modified buttress thread; the thread of threaded nozzle port 14 is a 2.125 inch 6 pitch-Butt 3 modified thread with a 7° leading edge and 45° trailing edge.

Ridge 40A and valley 42A as shown partially in FIG. 2 spiral about the inside of nozzle port 14 adjacently in creating the threads thereof for attachment of the aforementioned threaded aluminum nozzle. Angle A of the threads (as shown in FIG. 2) is 45° and angle B is 7°. The spiral has a constant diameter. Layers of resin impregnated glass cloth (Style 116) 44 and tows 46 of S-2 glass form threaded nozzle port 14.

Ridge 48F and valley 50F (FIG. 3) similarly spiral about threaded access port 16 in creating the threads thereof for closure by closure member 24. The spiral has a 1½° tapered diameter. Angle A' of these forward threads is 45° and angle B' is 7° as shown in FIG. 3.

FIG. 3 also depicts the buildup of fibrous reinforcement in the forward section of rocket motor case 10. This buildup is displayed in FIG. 3 by the illustration of glass and resin layers in an aft portion of access port 16. Glass cloth layer 52 in this illustration is scrim cloth which is used to give a smooth surface to the threads within access port 16. Layer 52 is style 116 glass cloth (available from J. P. Stevens) and is about 0.004 inches thick. Tow 54 is a bundle of about 12 strands of S-glass (available from Owens Corning Fiberglass Corp.) continuous fiber wound at 7-9 pounds tension at the same angle as the threads in order to pull the cloth of layer 52 into ridge 48F. Layer 56 is another layer of style 116 cloth and is about 0.004 inches thick. Layer 56 is pulled down to layer 52 in ridge 48F using tow 58 in the same manner as tow 54. Layer 60 is S904/34 glass cloth (available from Owens Corning Fiberglass) and about 0.013 inches thick. Layer 60 is pulled down toward layer 56 in ridge 48F using tow 62 in the same manner as tow 54. Layer 64 is made of two plies of S-glass glass fiber that are helically wound about cylindrical section 12 and access port 16. Layer 64 is 0.012 inches thick.

Tow 66 pulls layer 64 into ridge 36F. Layer 68 is another layer of S904/34 glass cloth and is about 0.013 inches thick. Tow 70 similiarly pulls layer 68 into ridge 48F toward layer 64. Layer 72 is the second layer (0.012 inches thick) of two plies of helically wound glass fiber. Tow 74 pulls layer 72 into ridge 48F. Layer 76 is S904/34 glass cloth at 0.013 inches thick. Tow 78 pulls this cloth layer 76 toward layer 72. Layer 80 is the third of the two ply, helically wound layers 64, 72 and 80. (In each of layers 64, 72 and 80 a first ply has filament disposed, relative to lines parallel to center axis 11, at an angle with an absolute value of 20° and the second ply has filament disposed at an angle which is the negative of the first.) Layer 80 is about 0.012 inches thick. Layer 80 is pulled down with another tow similiarly to the other, foregoing described, tows. The remainder of the well of ridge 48F and access portion 16 is built up to level with a plurality of passes with single tows wound at the pitch of the buttress threads. Buildup 82 is made of hoop layers and helical layers. The hoop layers have two plies, one at the negative angle of the other, having filaments disposed (relative to lines parallel to central longitudinal axis) at between about 82°-89° in absolute value. The helical layers have two plies, one at the negative angle of the other, having filaments disposed (relative to lines parallel to such central longitudinal axis) at an angle of between about 15°-25° in absolute value). These hoop and helical layers build up integrally threaded access port 16 and the rest of rocket motor case 10 (including dome section 18) in an angular manner discussed below in connection with layers 64, 72 and 80. The build up 82 is about 0.10 inches thick.

All of the foregoing fibers are preferably wet wound, i.e. impregnated with thermosettable resin such as EPON ®826/Tonox ®6040, available from Shell Chemical/Uniroyal, prior to winding.

Each of cloth layers 60, 68 and 76 as well as the second style 116 cloth layers 52 and 56 extend several inches into different axial locations aft of metal ring 38 for increased reinforcement of threaded access port 16. Cloth layers 60, 68 and 76 have fiber density highest in the axial direction for increased axial reinforcement.

In addition, prior to laying the alternating axially reinforced glass cloth and helical layers of access port 16, six layers of glass style 64T cloth 84 and six glass hoop layers 86 are layed in alternating fashion in the cavity of metal ring 38. Further, hoop layers 88 are wound about each of the helical layers 64, 72 and 80 aft of threaded access port 16 prior to pulling these helical layers 64, 72 and 80 into ridge 48F.

Figure 4:
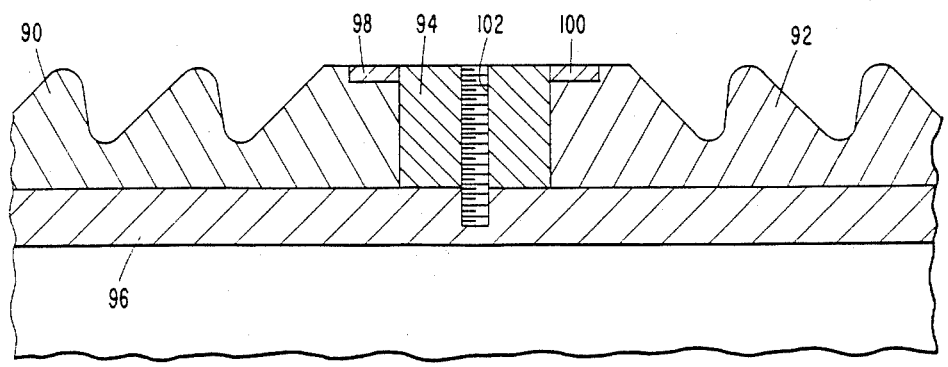
FIG. 4 depicts in cross section a portion of two spaced thread formers carried on a mandrel core. These thread formers are used in winding two pressure vessels of this invention concurrently.

FIG. 4 depicts in cross section adjacent portions of thread formers 90, 92 spaced by cylindrical spacer member 94. This arrangement is used in a practice of this invention which makes two rocket motor case concurrently during a single winding operation. One of the pressure vessels is made using thread former 90; thread former 92 is used in making the other.

Thread formers 90, 92 and cylindrical member 94 are fixedly mounted to hollow, cylindrical mandrel core 96. Thread formers 90,92 are each tubular sections. (The upper cross-section of each of thread formers 90,92 is shown in FIG. 4.) Mandrel core 96 is rotatable in winding filaments about thread formers 90, 92.

The thread formers 90, 92 each mount on mandrel core 96 discretely from the other, aft, mandrel parts used in forming the rocket motor cases. Rings 98, 100 respectively press fit onto thread formers 90, 92 in mounting each of thread formers 90,92 to mandrel core 96.

Cylindrical spacer member 94, as mentioned, acts as a spacer between thread formers 90, 92. Threaded bore 102 is one of four holes used to bolt spacer 94 to mandrel core 96.

In manufacture of the two rocket motor cases using the thread formers 90, 92 of FIG. 4, each of layers 64, 72 and 80 (reference FIG. 3) is wound so as to be continuous between the aft ends of each of the nozzle ports 14 of the two rocket motor cases.

The angle of the filament in each of these layers 64, 72 and 80, relative to lines parallel to the central longitudinal axes of these rocket motor cases, is ±20° between just forward of the dome sections 18 and the forward ends of each case. In dome section 18 the angle of the filament in layers 64, 72 and 80 relative to these parallel lines, is determined by the relation: Sin $R_1 D_1$=Sin $R_2 D_2$ wherein $R_1$ and $R_2$ are respectively the radius of the portion of the dome section 18 being wound and $D_1$ and $D_2$ are the angles at which such fibers lie relative to these lines parallel to the center axis 11 projected onto the surface of the dome section. Thus, for example, a ply of layer 64 has filament disposed at an absolute value of 20° relative to lines parallel to center axis 11 at the threaded access port 16 but closer to 90° around dome section 18 relative to these lines projected onto the surfaces of each of sections 18.

Following the winding of helical layer 64 around the access ports 16 (and before applying tow 62), the second of hoop layers 88 is wound about such layer 64. (Each of such hoop layers 88 is two plies of filament, filament of the first ply being at an absolute angle of between about 82°–89° and the angle of filament of the other ply being the negative of the first). The winding of this second (and others) of the hoop layers 88 starts at the aft metal ring 38, extends to the aft dome/cylinder junction and returns, terminating just aft of metal ring 38. Then, two sacrificial hoop layers (i.e. four plies each having filament at an angle of between about 82° and 89° in absolute value) are wound around cylindrical member 94 in order to maintain tension on said helical layer 64. Layer 64, so bound, is then cut circumferentially about cylindrical member 94 midway between thread former 90,92 so that when the tow 66 is wound at the thread pitch of 0.125 inch, it pulls portions this layer 64 inwardly into ridges 48F of each of the rocket motor cases. The two sacrifical hoop layers are then removed from spacer 94. Then the portions of this helical layer 64 extending beyond the forward ends of the two rocket motors on are cut and removed. This pull down procedure is used in the winding of each of the helical layers 64, 72 and 80.

Wide mouth, rocket motor cases made using the foregoing procedures can withstand high internal pressure induced axial distributed loading exemplary of which axial distributed loads are those in a range between about 4500 and 6500 psi. The closure or retention ring member 24 in these rocket motor cases is preferably formed independantly of the rocket motor case threads. (By "formed independantly" is meant that the closure member is not used as a thread former in making the rocket motor case. By "wide mouth" polar opening of a pressure vessel is meant openings in which the diameter thereof is between about 0.5 to 1.2 times the larger diameter of the pressure vessel.)

This invention is currently particularly applicable to tactical rocket motor cases in which the diameter thereof ranges up to about two feet, and the diameter of the aft polor opening opening is between about 0.6 and 1.1 times thereof.

EXAMPLE

A rocket motor case generally conforming to FIG. 1 is fabricated in accordance with the fabrication sequence below using a rotating mandrel. The skirt section is a singular, integral cylindrical section of an outer diameter corresponding to the cylindrical section of the rocket motor case. The rocket motor case has a large cylindrical, outer diameter of 5.988 inches, a length of 41.5 inches and threads of pitch as previously described. A concentric mandrel section is used during skirt fabrication. A temporary hoop ply is wound about each helical layer which is then cut forward of the rocket motor case prior to pull down. The temporary hoop ply is then removed. After winding, the case is cured while rotating according to the following schedule: 140° F.±10° F. for a minimum of six (6) hours or until the thermosettable resin (HBRF 55A) is B-staged; 200° F.±10° F. for three hours; and 250° F.±10° F. for six hours.

The product fabrication sequence is as follows:

| Step | Fabrication Sequence |
| --- | --- |
| 1 | Style 116 Cloth, 3 in. length, over aft thread/blast tube |
| 2 | Single Roving S-2 Fiberglass pull-down at thread lead |
| 3 | Style 116 Cloth, 3.50 in. length, over aft thread/blast tube |
| 4 | Single Roving S-2 Fiberglass pull-down at thread lead |
| 5 | Style 116 Cloth, 4 in. length, over aft thread/blast tube |
| 6 | Single Roving S-2 Fiberglass pull-down at thread lead |
| 7 | Style 116 Cloth, 5 in. length, over aft thread/blast tube |
| 8 | 3 Roving S-2 Fiberglass pull-down at thread lead |
| 9 | Style 116 Cloth, 6 in. length, over aft thread/blast tube |
| 10 | 3 Roving S-2 Fiberglass Fill |
| 11 | Style 116 Cloth, 7.50 in. length, over forward thread |
| 12 | Single Roving S-2 Fiberglass at thread lead |
| 13 | Style 116 Cloth, 6.75 in. length, over forward thread |
| 14 | Single Roving S-2 Fiberglass at thread lead |
| 15 | Style 64T Cloth, .50 in. length in seal ring cavity |
| 16 | 3 Roving S-2 Fiberglass Hoop Layer, .125 in. band width |
| 17 | Style 64T Cloth, .50 in. length in seal ring cavity |
| 18 | 3 Roving S-2 Fiberglass Hoop Layer, .125 in. band width |
| 19 | Style 64T Cloth, .63 in. length in seal ring cavity |
| 20 | 3 Roving S-2 Fiberglass Hoop Layer, .125 in. band width |
| 21 | Style 64T Cloth, .63 in. length in seal ring cavity |
| 22 | 3 Roving S-2 Fiberglass Hoop Layer, .125 in. band width |
| 23 | Style 64T Cloth, .75 in. length in seal ring cavity |
| 24 | 3 Roving S-2 Fiberglass Hoop Layer, .125 in. band width |
| 25 | Style 64T Cloth, .75 in. length in seal ring cavity |
| 26 | 3 Roving S-2 Fiberglass Hoop Layer, .125 in. band width |
| 27 | Single Hoop Roving at .50 in. lead over exposed rubber liner cylindrical surface |
| 28 | Style S904/34 cloth, 13 in. length over forward threads |
| 29 | Single Roving S-2 Fiberglass in forward threads |
| 30 | 20° Helical Layer, 3 roving, .245 in. band with over cylinder and blast tube |
| 31 | Hoop Layer, 3 roving, .300 in. band width over cylinder aft of forward threads |

-continued

| Step | Fabrication Sequence |
|---|---|
| 32 | Single Roving S-2 Fiberglass in forward threads |
| 33 | Style S904/34 Cloth, 11 in. length over forward threads |
| 34 | Single Roving S-2 Fiberglass in forward threads |
| 35 | 20° Helical Layer, 3 roving, .245 in. band width over cylinder and blast tube |
| 36 | Hoop Layer, 3 roving, .300 in. band width over cylinder aft of forward threads |
| 37 | Single Roving, S-2 Fiberglass in forward threads |
| 38 | Style S904/34 Cloth, 9 in. length over forward threads |
| 39 | Single Roving S-2 Fiberglass in forward threads |
| 40 | 20° Helical Layer, 3 roving, .245 in. band width over cylinder and aft dome |
| 41 | Hoop Layer, 3 roving, .300 in. band width over cylinder aft of forward threads |
| 42 | Single Roving S-2 Fiberglass in forward threads |
| 43 | Hoop Fill, S-2 Roving over forward threads |
| 44 | Style 1581 Cloth in Skirt "Y" joint |
| 45 | 2-048 O-Ring in Skirt "Y" joint |
| 46 | Single Roving S-2 Fiberglass Hoop Fill |
| 47 | Style 1581 Cloth, 1.50 in. long over skirt |
| 48 | Hoop Layer, 3 roving, .250 in. band width over skirt |
| 49 | Style 1581 Cloth, 1.50 in. length over skirt |
| 50 | Hoop Layer, 3 roving, .250 in. band width over skirt |
| 51 | Style 1581 Cloth, 1.60 in. length over skirt |
| 52 | Hoop Layer, 3 roving, .250 in. band width over skirt |
| 53 | Style 1581 Cloth, 1.70 in. length over skirt |
| 54 | Hoop Layer, 3 roving, .250 in. band width over skirt |
| 55 | Style 1581 Cloth, 1.70 in. length over skirt |
| 56 | Hoop Layer, 3 roving, .250 in. band width over skirt |
| 57 | Style 1581 Cloth, 1.80 in. length over skirt |
| 58 | Hoop Layer, 3 roving, .250 in. band width over skirt |
| 59 | Style 1581 Cloth, 1.80 in. length over skirt |
| 60 | Hoop Layer, 3 roving, .250 in. band width over skirt |

Apply as required to achieve 5.974 diameter.

The foregoing has described this invention in detail so that its practice may be readily realized; the true scope of this invention, however, is not limited to these details but, rather, as is embodied in the claims appended hereto.

What is claimed is:

1. A method of filament winding a pair of pressure vessels, each of said vessels having a large opening that is internally threaded with threads that are integral therewith, said method comprising:
    (a) providing first and second thread formers as part of a mandrel used in making said vessels, said thread formers spaced by a spacer having a common center axis with said thread formers and other portions of said mandrel and respectively configured to provide said threads for each of said openings;
    (b) winding filament about said mandrel in a helical layer having filament disposed, relative to lines parallel with said center axis, at an angle having an absolute value between about 5° and 35°, said winding being over said thread formers, spacer and other portions of said mandrel;
    (c) winding filament over said helical layer in a hoop layer having filament disposed, relative to lines parallel to said center axis, at an angle having an absolute value between about 82° and 89°, said hoop layer terminating at locations axially proximate those ends of said thread formers that are remote from said spacer;
    (d) winding filament over said helical layer on said spacer at an angle, relative to lines parallel with said center axis, that has an absolute value between about 82° and 89°;
    (e) cutting said helical layer circumferentially about said spacer midway between said thread formers;
    (f) pulling said helical layer into each of said thread formers with a first tow of filament wound at the pitch of said threads;
    (g) removing said filament carried on said spacer;
    (h) laying a first filamentary cloth around said thread former carrying said thread first tow therein and a second filamentary cloth around said second thread former carrying said first tow therein;
    (i) pulling said first and second filamentary cloths into said thread formers with a second tow wound at the pitch of said threads;
    (j) continuing fabrication of said pressure vessels by winding a second helical layer as in (b), winding a second hoop layer as in (c), winding filament on said spacer over said second layer as in (d), cutting said second helical layer as in (e), pulling said second helical layer into said thread formers with a third tow as in (f), removing filament from said spacer as (g), laying third and fourth filamentary cloths as in (h), and pulling said first and second filamentary cloths into said thread formers with a third tow as in (i);
    (k) building up said pressure vessel after still another helical layer and filamentary cloths are pulled by a fourth tow into said thread formers, said building up comprising winding hoop and helical layers about said mandrel over said thread formers;
    (l) curing thermosettable resin carried by said cloths, hoop and helical layers and tows to provide said pressure vessel.

2. A method in accordance with claim 1, wherein said pressure vessels are rocket motor cases.

3. A method in accordance with claim 2, wherein each said thread former is subsequently used as the retention ring for the rocket motor case which was wound using such thread former and comprises aluminum.

4. A method in accordance with claim 1, whrein said thread formers subsequently are used in providing another pair of rocket motor cases.

5. The method in accordance with claim 1, wherein said filament in said hoop and helical layers comprise glass filaments.

6. The method in accordance with claim 2, wherein each of said cloths is positioned over said thread formers such that there is a higher density of filament parallel said center axis than around said center axis.

7. The method in accordance with claim 6, wherein said first cloth comprises glass filaments.

8. The method in accordance with claim 1, wherein said thread formers comprise buttress threads.

9. The method in accordance with claim 1, wherein said filaments of at least one of said hoop layers comprises glass filaments.

10. The method in accordance with claim 1, wherein said filaments of at least one of said helical layers comprises glass filaments.

11. The method in accordance with claim 1, wherein said resin comprises an epoxy resin.

* * * * *